UNITED STATES PATENT OFFICE.

VICTOR LENHER, OF MADISON, WISCONSIN.

MANUFACTURE OF SELENIUM OXYCHLORID.

1,382,920.  Specification of Letters Patent.  Patented June 28, 1921.

No Drawing.  Application filed May 15, 1920. Serial No. 381,628.

*To all whom it may concern:*

Be it known that I, VICTOR LENHER, a citizen of the United States, residing at Madison, in the county of Dane and State of Wisconsin, have invented a new and useful Improvement in the Manufacture of Selenium Oxychlorid, of which the following is a specification.

This invention relates to a method of manufacturing selenium oxychlorid ($SeOCl_2$); and the primary object is to provide a practical method of manufacture which will enable this compound to be produced on a commercial scale.

I have discovered a practicable process of producing selenium oxychlorid on a commercial scale, and, having produced the compound in considerable quantities, I have demonstrated that it possesses such remarkable properties as a solvent that it may be put to many useful applications. It may be used as a solvent for numerous substances or compounds for which no known solvent exists, and it may be mixed or compounded with other active compounds having the effect of increasing its range as a solvent, thus rendering it possible to dissolve readily substances or compounds which selenium oxychlorid alone will not dissolve or will dissolve only with difficulty. Uses for the new compound too numerous to mention are contemplated by me. Novel methods of producing or recovering certain substances, involving the use of selenium oxychlorid or compounds thereof are contemplated by me. Various uses may be made of the compound, some of which will be hereafter suggested.

In accordance with the preferred method, I combine selenium tetrachlorid ($SeCl_4$), which is a white crystalline solid, directly with selenium dioxid ($SeO_2$), which is a white crystalline solid, in such manner as to produce selenium oxychlorid ($SeOCl_2$) directly in the form of a liquid, the reaction being carried on in the presence of the selenium oxychlorid as it is progressively formed. The product, as it forms, acts as a solvent for both of the constituent compounds and this doubtless facilitates the reaction. It is possible also that the fresh character of the selenium oxychlorid as it is formed may favorably influence the reaction. One may, however, after having first obtained a supply of the product, employ a suitable amount of the same at the outset as a solvent for the constituent compounds employed to produce the product, so as to have present at all stages of the process a solvent for the constituent compounds entering into the reaction.

$SeO_2$ and $SeCl_4$ will combine chemically at ordinary temperatures. It is preferred, however, to expedite the reaction by applying a moderate degree of heat, such as will not vaporize either of the constituent compounds. It is preferred, also, to carry on the reaction in the presence of a solvent for chlorin, for selenium monochlorid ($Se_2Cl_2$), and for selenium oxychlorid, such as carbon tetrachlorid ($CCl_4$), chloroform ($CHCl_3$), or other suitable solvent.

I have found it desirable, by certain novel steps of procedure, to produce $SeCl_4$ in suspension and then mix therewith the appropriate amount of $SeO_2$, whereupon the reaction takes place at ordinary temperatures or may be facilitated by warming, thus carrying on the reaction in the bath and forming $SeOCl_2$ as a liquid, which dissolves in the solvent. The solvent employed, such as $CCl_4$, may then be distilled over and recovered for future use, and the $SeOCl_2$ will remain as a liquid. If desired, this liquid may be distilled and the vapors condensed, thus effecting purification of the product. This may be desirable, especially where the constituent compounds of selenium employed in the process, or one of them, carries impurities. A practicable and desirable method, in accordance with the foregoing, is as follows: Mix a quantity of selenium (Se), pure or impure, with carbon tetrachlorid, or other solvent of the character mentioned above, and pass chlorin gas through the mixture, which is preferably agitated to keep the selenium in suspension, although the bubbling of the chlorin gas may suffice to effect the agitation. This converts selenium into selenium monochlorid ($Se_2Cl_2$), which, as it is formed, acts as a solvent for the selenium and also dissolves in the carbon tetrachlorid. The chlorination process is continued until the selenium is converted into $Se_2Cl_2$ and finally into $SeCl_4$ which remains mainly in suspension in the carbon tetrachlorid, although a small amount passes into solution. Now introduce selenium dioxid ($SeO_2$) into the carbon tetrachlorid which holds the $SeCl_4$ in suspension, and thus effect the reaction which forms the $SeOCl_2$ as a liquid, which dissolves in the carbon tetrachlorid. Heat may be applied to facilitate the reaction.

The process should be carried out in a vessel which will not be attacked by the product, such as a porcelain, terra cotta, or glass vessel, or a glass-lined still. An open flask may serve for the practice of the process on a small scale. If desired, the process may be practised by means of a still having facilities for applying moderate heat until the product is formed and then applying greater heat to distil over the carbon tetrachlorid, and finally applying still greater heat to distil over the selenium oxychlorid, which may be recovered by a suitable condenser. Separate eduction pipes for the distillates, provided with stop-cocks, may be a part of the equipment of the still. Also, suitable provision should be made for discharging or cleansing from the still any residue of impurities which may remain in the still after the evaporation of the selenium oxychlorid.

Selenium is a solid at ordinary temperatures and may be either granular or vitreous. It may possess different forms, and may be available in masses containing various impurities. Crude selenium may be employed in the process or compounds of selenium may be employed. For instance, metallic compounds, such as FeSe or CuSe, may be employed as a source for the selenium, and these may be converted into $Se_2Cl_2$ in accordance, for example, with the formula:

$$2FeSe+6Cl=Se_2Cl_2+2FeCl_2$$

The $Se_2Cl_2$ may then be converted, by chlorination, to $SeCl_4$. If desired, $SeCl_4$ may be produced by direct chlorination of selenium by passing chlorin gas over selenium.

The reactions by which the $SeOCl_2$ is produced may be as follows:

$$2Se+2Cl=Se_2Cl_2$$
$$Se_2Cl_2+6Cl=2SeCl_4$$
$$SeCl_4+SeO_2=2SeOCl_2$$

The last equation indicates the proportions of the constituent compounds to be used. This equation is satisfied by substantially twice as much $SeCl_4$ as $SeO_2$, by weight, but in practice it is preferable to employ slightly more than one-third of $SeO_2$.

Selenium oxychlorid, at normal temperature, is a liquid of slightly yellowish cast. It boils at 176° C. and possesses a specific gravity of 2.44. It possesses remarkable solvent qualities, being capable of dissolving many substances or compounds for which no known solvent has hitherto existed. It is a solvent for (among others) the following substances:

Japans, paints, varnishes, rubber, pure or vulcanized;

Resins, pitch, glues, shellacs;

Lacquers, waxes, oils;

Fats, greases, hydrocarbons, certain metals;

Salts, certain oxids, phenolic condensation products, including the infusible and so-called insoluble products, etc.

The foregoing is sufficient to show the possibilities of many different applications of selenium oxychlorid, such as the separation of substances by novel processes, the production of new compounds, and the production of known compounds by novel processes.

The production of a novel compound which will act as a solvent for certain substances or compounds for which the selenium oxychlorid itself will not serve has been mentioned. As an illustration, $SeOCl_2$ may be used to dissolve such active compounds as sulfur trioxid ($SO_3$), thus producing a new compound which will serve as a solvent for other substances not attacked by known solvents and not attacked by $SeOCl_2$ itself. Again, such compounding produces a more active solvent for some purposes, i. e., a solvent which will act more quickly than $SeOCl_2$ alone. The proportions may vary within quite wide range. As an example, an excellent solvent is produced by dissolving 10 parts by weight of $SO_3$ in 90 parts by weight of $SeOCl_2$. This produces a compound which will act as a solvent for various materials, including certain oxids, for example, titanium oxid ($TiO_2$), vanadium oxid ($V_2O_5$), and columbium pentoxid ($Cb_2O_5$). This indicates the separation of metals from ores by new processes.

A modified method of producing $SeOCl_2$ in liquid form is to mix together selenium and water and pass chlorin gas through the mixture, applying moderate heat, if desired, to expedite the reaction. The reaction may be effected in accordance with either of the following equations:

$$Se+4Cl+H_2O=SeOCl_2+2HCl$$
$$SeCl_4+H_2O=SeOCl_2+2HCl$$

The hydrochloric acid may be separated by boiling it off, and the selenium oxychlorid may be distilled, for purification purposes, if desired. The oxychlorid is produced directly as a liquid. Obviously, the $SeCl_4$ may be produced in accordance with one of the methods described above. For example, selenium may be mixed with carbon tetrachlorid and chlorin gas passed through the mixture, the reaction proceeding until the selenium has all been converted to $SeCl_4$, which remains mainly in suspension in the carbon tetrachlorid. The water may then be introduced, in proper proportion, to effect the reaction indicated in the last formula, after which the hydrochloric acid and the carbon tetrachlorid will be evaporated.

Another modification of the method of producing $SeOCl_2$ directly in liquid form is as follows:

Mix $SeO_2$ and a dehydrating agent, as for example, phosphorus pentoxid ($P_2O_5$) or calcium chlorid ($CaCl_2$), heat the mixture and pass hydrochloric acid gas (HCl) over the heated mixture. The reaction may proceed in accordance with the following equations:

(a) $SeO_2 + 2HCl = SeO_2.2HCl$
(b) $SeO_2.2HCl + P_2O_5 = SeOCl_2 + 2HPO_3$.

The $SeOCl_2$ may be distilled over and condensed and the metaphosphoric acid will remain as a residue.

The foregoing equations are satisfied by the following proportions, viz:

$SeO_2$, 111 parts by weight;
$P_2O_5$, 142 parts by weight;
HCl, 73 parts by weight.

It may be necessary or desirable to moderate the solvent action of selenium oxychlorid for certain purposes. This may be done, for example, by mixing with a quantity of the oxychlorid a quantity of some substance which is not an active substance, and which will thus act as a diluent. For example, one may mix 25 pounds of selenium oxychlorid with 75 pounds of carbon tetrachlorid, thus producing a mild form of solvent which may be employed, in general, where a mild solution is desired as a solvent or a reagent. The mixture of selenium oxychlorid with such a substance may be made of any desired proportions, according to the use or purpose intended. Crude selenium may be employed in the process; or, if desired, compounds of selenium, such as iron selenid (FeSe) or copper selenid (CuSe) may be employed. For example, FeSe may be suspended in carbon tetrachlorid and chlorin gas passed therethrough, producing $Se_2Cl_2$ and $FeCl_2$ or $FeCl_3$. The $Se_2Cl_2$ that is selenium monochlorid, may be converted into selenium tetrachlorid by continuing the chlorination process. The necessary proportion of water to convert the selenium tetrachlorid to selenium oxychlorid may be added. Separation of the materials may be effected in any suitable manner, it being understood that if the selenium oxychlorid be distilled, the $FeCl_2$ or $FeCl_3$ will remain as a residue. If the water be added after the selenium tetrachlorid has been formed, the reaction may proceed in accordance with the following equations:

$SeCl_4 + 2H_2O = SeO_2 + 4HCl$
$SeCl_4 + SeO_2 = 2SeOCl_2$.

The foregoing detailed description has been given for clearness of understanding only and no unnecessary limitations should be understood therefrom, but the appended claims should be construed as broadly as permissible in view of the premises.

What I regard as new, and desire to secure by Letters Patent, is—

1. The process of producing selenium oxychlorid which consists in chemically combining in a bath ingredients comprising selenium, chlorin and oxygen to form said selenium oxychlorin directly as a liquid in said bath and continuing such reaction in the presence as a solvent of the liquid selenium oxychlorid formed.

2. The process of producing selenium oxychlorid which comprises chemically combining selenium tetrachlorid and selenium dioxid to form said selenium oxychlorid directly as a liquid and continuing such reaction in the presence as a solvent of the liquid selenium oxychlorid formed.

3. The process of producing selenium oxychlorid which comprises chemically combining selenium tetrachlorid and selenium dioxid to form said selenium oxychlorid directly as a liquid, continuing such reaction in the presence as a solvent of the liquid selenium oxychlorid formed, and then purifying the product by distillation.

4. The process of producing selenium oxychlorid which comprises chemically combining selenium tetrachlorid and selenium dioxid in the presence of a solvent for both constituent compounds.

5. The process of producing selenium oxychlorid which comprises chemically combining selenium tetrachlorid and selenium dioxid in the presence of a solvent for both constituent compounds, and producing said selenium oxychlorid directly as a liquid.

6. The process of producing selenium oxychlorid which comprises chemically combining selenium tetrachlorid and selenium dioxid in the presence of a solvent for selenium oxychlorid, thus producing $SeOCl_2$ in liquid form, and continuing the reaction in the liquid bath as the selenium tetrachlorid and selenium dioxid are progressively dissolved in the selenium oxychlorid formed.

7. The process of producing selenium oxychlorid which comprises chemically combining selenium tetrachlorid and selenium dioxid in the presence of a solvent for selenium oxychlorid, thus producing $SeOCl_2$ in liquid form, continuing the reaction in the liquid bath as the selenium tetrachlorid and selenium dioxid are progressively dissolved in the selenium oxychlorid formed, and distilling off the solvent for selenium oxychlorid.

8. The process of producing selenium oxychlorid which comprises chemically combining selenium tetra-chlorid and selenium dioxid in the presence of a solvent for selenium oxychlorid, thus producing $SeOCl_2$ in liquid form, continuing the reaction in the liquid bath as the selenium tetrachlorid and selenium dioxid are progressively dissolved in the selenium oxychlorid formed, distilling off the solvent for selenium oxychlorid, and then purifying the selenium oxychlorid by distillation.

9. The process of producing selenium oxychlorid which comprises mixing selenium and a solvent for both chlorin and selenium monochlorid, introducing chlorin gas therein to convert the selenium to selenium monochlorid and ultimately to selenium tetrachlorid, mixing selenium dioxid with the liquid holding the selenium tetrachlorid in suspension and thus effecting the formation of selenium oxychlorid as a liquid, and distilling off said solvent.

10. The process of producing selenium oxychlorid which comprises mixing selenium and a solvent for both chlorin and selenium monochlorid, introducing chlorin gas therein to convert the selenium to selenium monochlorid and ultimately to selenium tetrachlorid, mixing selenium dioxid with the liquid holding the selenium tetrachlorid in suspension and thus effecting the formation of selenium oxychlorid as a liquid, distilling off said solvent, and purifying the selenium oxychlorid by distillation.

11. The process of producing selenium oxychlorid which comprises chemically combining selenium tetrachlorid and selenium dioxid in the presence of carbon tetrachlorid.

12. The process of producing selenium oxychlorid which comprises chemically combining ingredients comprising selenium, oxygen and chlorin in the presence of a solvent for selenium oxychlorid.

13. The process of producing selenium oxychlorid which comprises chemically combining ingredients comprising selenium, oxygen and chlorin in the presence of selenium oxychlorid and a solvent for the same.

14. The steps for producing selenium tetrachlorid in suspension comprising: mixing selenium and a solvent for both chlorin and selenium monochlorid; introducing chlorin gas into said mixture to form selenium monochlorid which acts as a solvent for selenium; and continuing the process until the selenium and selenium monochlorid are converted into selenium tetrachlorid.

15. The process of producing selenium oxychlorid which comprises chemically combining selenium dioxid, selenium and chlorin gas by a chlorinating process.

VICTOR LENHER.